June 7, 1955   C. J. GREINER ET AL   2,710,007
CATAMENIAL TAMPON
Original Filed July 1, 1948   2 Sheets-Sheet 1
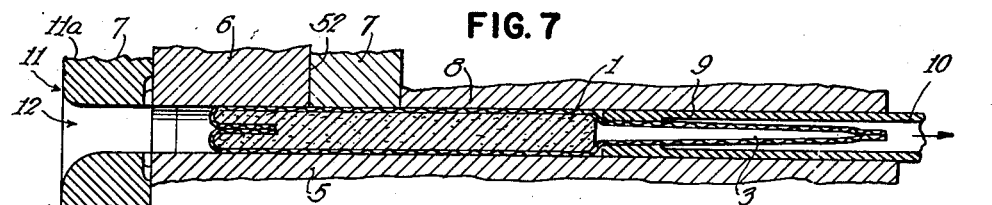
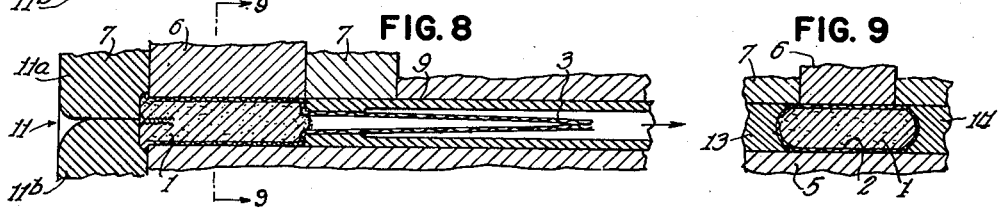
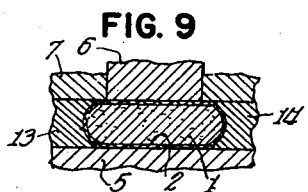
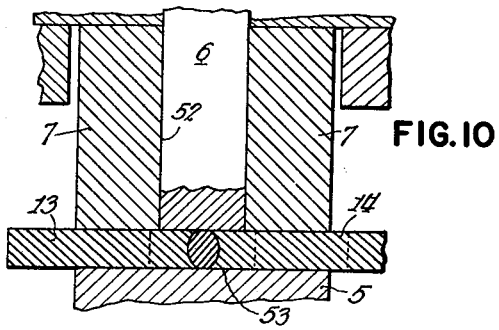
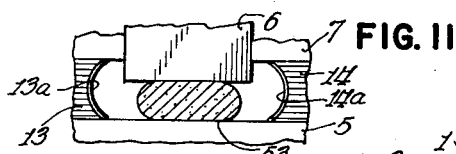
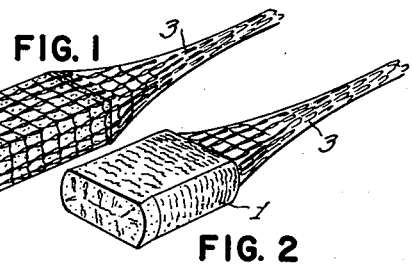
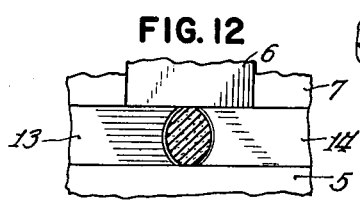
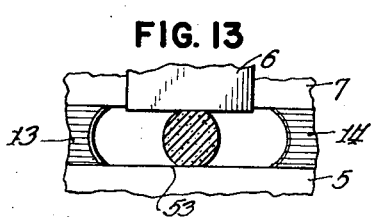
Inventors:
Charles J. Greiner
Howard A. Collins
By: Soans, Glaister & Anderson Attys.

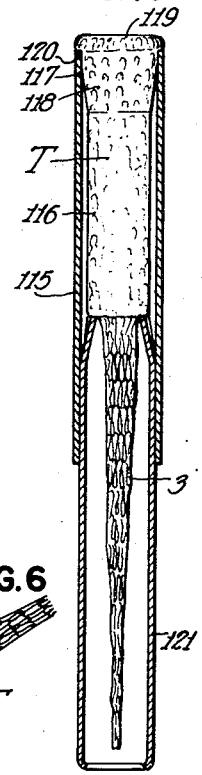
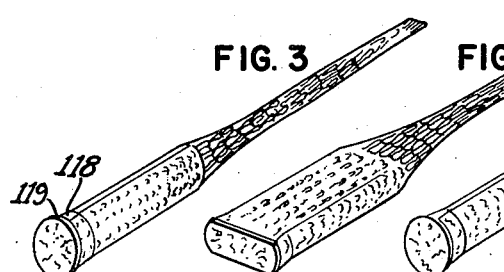
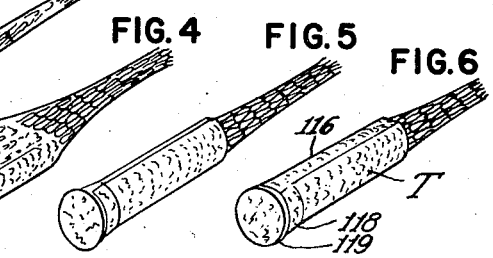
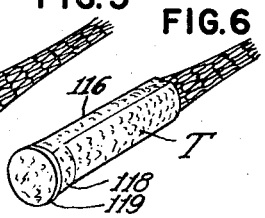
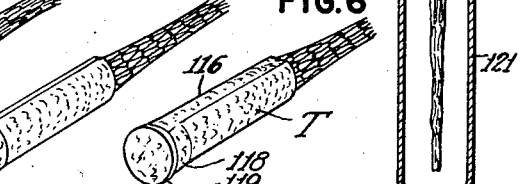
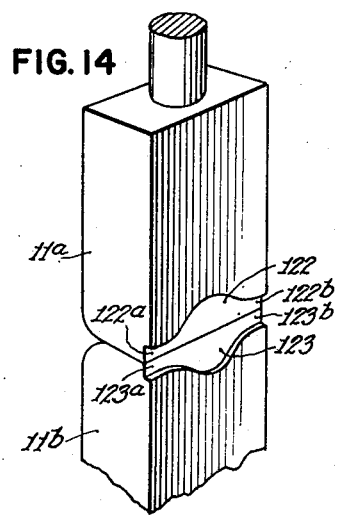
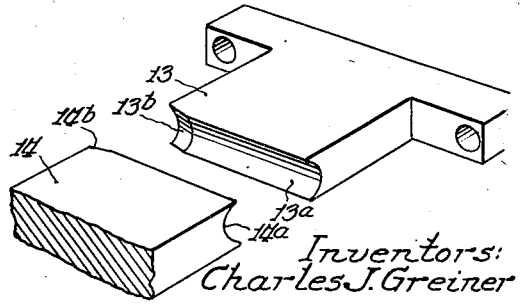

United States Patent Office 2,710,007
Patented June 7, 1955

2,710,007
CATAMENIAL TAMPON

Charles J. Greiner, Menasha, and Howard A. Collins, Neenah, Wis., assignors to International Cellucotton Products Company, Chicago, Ill., a corporation of Delaware Original application July 1, 1948, Serial No. 36,478. Divided and this application September 12, 1951, Serial No. 246,212

7 Claims. (Cl. 128—263)

This invention relates to catamenial tampons, and it is concerned particularly with a tampon having a body of compressed, absorbent material enclosed in a pervious material jacket, which may be manufactured in accordance with the method and by the apparatus disclosed in the co-pending Greiner et al. application, Serial No. 36,478, filed July 1, 1948, now Patent No. 2,690,597, the present application being a division of said co-pending application.

One of the objects of the invention is to provide a tampon of the compressed character indicated, which will be easily insertable into the vaginal cavity and which tampon, upon being wetted by menstrual fluid, will quickly expand—especially transversely—to fully occupy the cavity so as to prevent leakage of the menstrual fluid past the tampon. Another object is to provide a tampon which may be easily assembled with an applicator and which will stay in place in the applicator until it is intentionally ejected therefrom. Still another object is to provide a tampon which, although highly compressed and very dense, nevertheless embodies a very desirable softness characteristic.

Other objects and advantages of the invention will be understood by reference to the following specification and accompanying drawings (2 sheets) wherein there is illustrated a selected form of tampon embodying the invention.

In the drawings,

Figures 1 to 6 inclusive, illustrate successive stages of fabrication of a tampon according to the present invention, Figure 6 illustrating the completed tampon;

Figure 7 illustrates elements of a mechanism for fabricating the improved tampon from a prepared body such as shown in Figure 1;

Figure 8 shows the mechanism of Figure 7 in a changed position;

Figure 9 is a cross-section on the line 9—9 of Figure 8;

Figure 10 is similar to Figure 9, but shows a changed position of some of the parts;

Figures 11, 12, and 13 are more or less diagrammatic illustrations of certain steps in the operation of the mechanism;

Figures 14 and 15 are perspective illustrations of certain parts of the mechanism which, at least in part, determine the shape of the tampon produced by the illustrated mechanism, and Figure 16 is a cross section through a tampon and applicator therefor, the tampon being made in accordance with the present invention.

According to the present invention, a tampon is made from an elongated rectangular section or body 1 of absorbent material, such as cotton, cellulose or the like in a loose, fluffy and uncompressed state. Such uncompressed body is enclosed in a wrapper 2 of tubular textile material, which for present purposes, may be typified by a knitted tube which is knitted directly over the body 1. The end portion 3 of the knitted tube extends substantially beyond the adjacent end of the absorbent body 1 to form a draw string in the finished tampon and the other end portion 4 of the jacket is tucked into the body of the tampon so as to more or less anchor that end of the jacket in said body.

In one practical embodiment, the tampon body 1 in its initial condition, may be in the neighborhood of 4 inches long, 1⅛ inches wide, and about 15/32 inch in thickness.

The initial structure, as represented in Figure 1, is first subjected to a lengthwise compressing operation, which reduces the length of the body to about 1⅝ inches, the jacket material 2 being, of course, compressed with the body material. The product of this step is represented in Figure 2.

The second step is to compress the shortened body to reduce its width. The product of this step is represented in Figure 3, and in the typical example already referred to, the width may be reduced from approximately 1⅛ inches to approximately 5/16 inch. The dies employed for compressing the body are so shaped that a frusto-conical enlargement 118 and a mushroomed or flange end portion 119 are formed on the compressed, more or less cylindrical body portion 116 as shown in Figures 6 and 16.

The initial thickness of the tampon body is next reduced as represented in Figure 4 by another compressing operation. The thickness is reduced about 5/32 inch by a suitable compressing die, this operation serving also to partially restore the initial width of the tampon body, as represented in Figure 4.

A repeated compression of the width is then effected to restore the width to a dimension of approximately 5/16 inch as represented in Figure 5.

A final compressing step is effected in respect of the thickness, this time to a more limited extent (say about 1/64 inch), mainly for the purpose of facilitating removal of the tampon from the chamber formed by the dies employed for effecting the aforesaid compressing steps.

The repeated transverse compressing steps constitute a kneading action on the body which imparts a desirable softness characteristic to it notwithstanding its highly compacted condition. The final minor compression step may add somewhat to the said beneficial kneading effect on the tampon body but because of its small magnitude it does not materially disturb the interlocked condition of the fibers in the tampon body so that the latter remains in its highly compacted condition. The frusto-conical end enlargement 118 and said end flange portion 119 are also kneaded or worked during said compression steps but remain as readily distinguishable formations in the finished tampon T (Figures 6 and 16).

These steps of tampon forming result in a tampon in which the fibers of the absorbent body are united or more or less welded together to cause the body to retain its reduced size as represented in Figure 6. However, the body is not hardened to rigidity but is somewhat soft and is at least slightly flexible and slightly compressible between the fingers of a person's hand. The tampon body so formed is a highly desirable structure and well suited to function as a catamenial tampon.

The method of compressing the tampon body in accordance with the foregoing steps and portions of an apparatus suitable for practicing the method, are represented in Figures 7 to 15 inclusive. The elements of mechanism shown in these figures are also elements of the complete mechanism, shown in the above mentioned application Serial No. 36,478, now Patent No. 2,690,597, but a general understanding of the method and operation of the apparatus may be gained from said Figures 7 to 15 inclusive which will now be described.

The uncompressed tampon body with its draw string forming extension 3 is drawn by vacuum into a tubular die opening or compression chamber. The die opening is formed between a lower stationary bed plate 5 on one side and a vertically movable compression member 6. The compression member 6 is slidably mounted in a head member 7, which also cooperates with the bed plate 5 to form part of the chamber in which the uncompressed body is initially received. A top plate 8 which, like the member 7, is in normally fixed relation to the bed plate 5 completes the formation of the top of the chamber. The chamber space between the bed plate and the top plate of the chamber is closed by extensions of the member 7 and suitable filler strips, and at the front or open end of the chamber, by side compressing dies. A horizontally reciprocable plunger 9 is slidable within the die opening or chamber and said plunger is bored out longitudinally as indicated at 10 to receive the draw string portion 3 of the tampon structure. A vertically movable gate structure 11 comprising upper and lower gate bars 11a and 11b respectively, is associated with the front end of the die chamber. The uncompressed tampon body is initially delivered to the chamber through the front end opening indicated at 12 when the gate is in its open position, as shown in Figure 7, the bore 10 of the plunger 9 being then connected to a suitable source of vacuum so that the draw string portion 3 of the tampon structure will be drawn into the bore of the plunger while the main body part of the tampon is drawn into compression chamber to the position substantially illustrated in Figure 7.

After the tampon body is seated in the die chamber, as represented in Figure 7, the gate 11 is closed to provide an end wall for the chamber for cooperation with the adjacent end of the bored plunger 9 which is moved endwise toward the gate to effect the longitudinal compression of the tampon body which then appears as represented in Figure 8.

It is found that this endwise compression causes the production of a higher degree of compression in the draw string end of the tampon body than in its opposite or front end portion. The variation in the degree of compression from the front end to the rear or draw string end of the tampon body becomes progressively greater from the front end of the body to its rear end, probably due to the fact that all of the compression is effected by movement from said rear end only. Frictional resistance between the surfaces of the tampon and the surrounding walls of the chamber also probably have some significance in producing the indicated progressively varying degree of compression.

After the lengthwise compression is effected, the plunger 9 temporarily remains in its advanced position, as shown in Figure 8, and side compressing dies 13 and 14, which form part of the sides of the compression chamber, are moved toward each other from initial positions, as represented in Figure 9, to advanced positions as represented in Figure 10. This compresses the tampon body sidewise to a greatly reduced width and the tampon body then appears as shown in Figure 3.

This compression is effected with pressure which is high enough to cause the fibers of the tampon body to become more or less welded together so that the body will remain nearly in its compressed condition. The pressure required may vary somewhat due to variation in the characteristics of the body material and perhaps other operating conditions, but in general, the pressure should be from 2,000 to 6,000 pounds per square inch.

The dies 13 and 14 then return to their open position, as represented in Figure 11, whereupon the top die 6 is moved downwardly to compress the body in the direction of its thickness, the tampon body being thereby flattened and its width partially restored as represented in Figures 11 and 14. The top compressing die 6 is then returned upwardly and the side compressing dies 13 and 14 are again actuated to compress the tampon body sidewise, to place the body in the condition illustrated in Figure 5 which is, in outward appearance, the same as the condition illustrated in Figures 3 and 10.

A final conditioning step is represented in Figure 13 wherein the side dies 13 and 14 are again open to their fully open positions and the top die 6 is moved downwardly only a limited extent mainly to reduce the thickness of the tampon structure to slightly less than the vertical depth of the compression chamber or, at least, to cause said thickness of the tampon body to be a freely slidable fit in said tampon chamber. When the tampon has thus been made an easily slidable fit in the compression chamber and the top die 6 again elevated, compressed air is delivered into the bore of the endwise compressing die so as to effect pneumatic ejection of the finished tampon from the compression chamber. The gate 11 is, of course, opened preparatory to such ejection of the tampon out of the same end of the compression chamber that the tampon was delivered into the chamber.

To form the flared portion 118 and flanged end portion 119 of the tampon, the compressed tampon may be subjected to special operations after compression of the body, but these formations may also be formed as a part of the compressing operations.

To form the expanded and flanged portions of the tampon, as a part of the operation of compressing the tampon body, the side compressing dies 13 and 14 (see Figure 15) have their respectively adjacent cooperating faces 13a and 14a concavely arched to correspond substantially with the required more or less cylindrical form of the main body portion 116 of the finished tampon. End portions of the dies are relieved or beveled as indicated at 13b and 14b to approximately correspond with the desired flare of the portion 118 of the finished tampon. The said beveled portions 13b and 14b are, of course, also concavely arched to substantially conform to the frusto-conical form of said flared tampon portion 118.

To form the flanged end portion 119, the gates 11a and 11b (see Figure 14) have their faces, against which the tampon is compressed longitudinally, recessed as indicated at 122 and 123, these recesses having central portions which together define an approximately circular area corresponding to the flange end portion 119 of the tampon. These recesses 122 and 123 are elongated in the direction of travel of the side compressing dies 13 and 14 so that the recess 122 has extended end portions 122a and 122b, and the recess 123 has extended end portions 123a and 123b. These sidewise extensions of the recesses 122 and 123 permit the extreme end portion of the tampon adjacent the gates to maintain a flared relationship to the remainder of the tampon during the tampon formation steps represented in Figures 2 and 4 in which the tampon body is flattened and spread laterally considerably beyond the normal diameter of the ultimate cylindrical form of the tampon body. By employing separable gates 11a and 11b, it remains possible to open the gates by simple sliding movement after a tampon has been compressed against such gates.

It will be evident that the open-sided recesses 122 and 123 do not provide positive control for the formation of the end flange 119 in the side areas in which said recesses are open. This, however, is not a disadvantage inasmuch as it is not essential that any control be exercised as to the extent to which the extreme end portion of the tampon body will spread, this being more or less automatically taken care of by the character of the absorbent material employed in forming tampon bodies. Absorbent cotton or absorbent cellulosic material, which is generally employed to produce the tampon bodies, is readily moldable under pressure, but it does not flow freely, and even under the high pressures employed for compressing the tampon body lengthwise and transversely as already indicated, will cause only limited flanging of the end portion of the body into recesses such as 122 and 123 beyond the adjacent ends of the side compressing dies 13 and 14. Hence, even though the recesses 122 and 123 are open at their sides, and even though the central portions of such recesses were made to define an area having a diameter considerably larger than the diameter of the flanged end of the tampon, a satisfactory end flange would be produced. However, it is preferred that the central areas of the recesses 122 and 123 be so formed as to define a circular area of a diameter substantially corresponding to the desired finished tampon of the flanged end of the tampon.

When a tampon is formed in the manner hereinabove set forth, that is to say, by first compressing an absorbent body lengthwise and subsequently compressing it transversely to such an extent that the body will become stabilized in its reduced, compressed condition, an advantageous effect is obtained on the density of the tampon body. It is found that the density of the body will vary more or less gradually from the rear or outer end portion of the body, i. e., its draw string end, to a lesser density at its front or inner end. This variation in density is accompanied, especially in the expanded portion 118 (Figure 6), with increased resiliency, said portion 118 being noticeably more resilient than the main elongated portion 116 of the tampon body.

The described order of compression has the further advantage that the transverse compression tends to lock the fibers of the body against longitudinal re-expansion so that when the tampon is subjected to wetting as when placed in use, there is pronounced tendency for the tampon to expand transversely to a considerable degree before any substantial degree of longitudinal re-expansion can take place. This initial transverse expansion is highly desirable in that it tends to cause the tampon to quickly and expand and fill up the portion of the passageway in which it is seated, thereby to prevent the leakage or free passage of menstrual fluid along the walls of the vaginal canal past the tampon body.

The lesser density of the front or inner end of the body also promotes more rapid absorption of fluid in that end portion to thereby accelerate said tendency of the body to quickly re-expand transversely.

From the foregoing it can be seen that the described tampon structure possesses some important and advantageous characteristics in respect of its initial softness notwithstanding its high degree of compaction, and its rapid absorbing and expanding characteristics under normal conditions of use.

As shown in Figure 16 the finished tampon T may be mounted in an applicator tube 115. The applicator tube 115 is preferably of somewhat larger internal diameter than the main body portion 116 of the tampon so that said main body portion may be easily inserted into the applicator tube 115 from its open front end 117. The expanded front end portion 118 of the tampon fits snugly in the tube and frictionally holds the tampon in place in the tube. Also, the flanged or mushroomed front end of the tampon extends over the end wall 120 of the applicator tube so as to protect the walls of the vaginal cavity from engagement by the relatively hard material of the applicator tube.

The more or less flanged end portion 119 of the tampon may be made somewhat softer than the remainder of the tampon so as to provide an especially soft or cushion-like end portion which can rub across the walls of the vaginal cavity without danger of injuring the same. The flared portion 118 should be so formed as to provide sufficient frictional grip on the inside of the applicator tube 115 to prevent the tampon from accidentally dropping out of the tube while at the same time permitting the tampon to be easily ejected from the applicator tube by means of an ejector tube such as represented at 121 which is preferably a sliding frictional fit in the applicator tube 115. The draw string 3 of the tampon is preferably received within the applicator tube and ejector tube as shown. Because of the resiliency of the expanded portion 118 of the tampon, the desired frictional seating of the tampon in the applicator tube 115 is readily attained.

Various changes in the details of the described product may be made while employing the principles of the invention.

We claim:

1. In a tampon and applicator therefor, the tampon comprising a compressed body of absorbent material having an elongated portion and a transversely enlarged portion extending from one end of said elongated portion, and an applicator comprising a tube having an internal diameter loosely receiving said elongated body portion of the tampon but snugly receiving and frictionally gripping said transversely enlarged portion so as to thereby frictionally retain the tampon in the applicator.

2. A tampon and applicator according to claim 1 in which the tampon is provided with a head portion at one end projecting beyond said applicator tube and overlying such end.

3. A tampon and applicator according to claim 1 wherein the transversely enlarged tampon portion is disposed adjacent an end of the tube, and is provided with a head portion projecting beyond said tube end and overlying the same.

4. In a tampon and applicator therefor, the tampon comprising an elongated compressed body having an inner end portion and a main body portion, said compressed body being of absorbent material compacted to provide said inner end portion of a transversely enlarged size relative to the transverse dimension of the adjacent end of said main body portion, and an applicator comprising a tube having an internal diameter loosely receiving said main body portion and frictionally gripping said transversely enlarged inner end portion.

5. A tampon and an applicator tube in which said tampon is housed, the tampon comprising an absorbent material member having an elongated body portion which has a transverse dimension which fits freely in said tube, and having a seating portion which has a larger transverse dimension which seats frictionally in said tube to yieldingly hold the tampon therein.

6. A tampon and an applicator tube in which said tampon is housed, the tampon comprising an absorbent material member having an elongated body portion which has a transverse dimension which fits freely in said tube, and having a seating portion which has a larger transverse dimension which seats frictionally in said tube to yieldingly hold the tampon therein, said seating portion being adjacent an end of the tampon and of frusto conical form which expands toward said end of the tampon, whereby said body portion is freely insertable in the tube and is operative to guide said seating portion into engagement with the tube as aforesaid.

7. In a tampon and applicator therefor, a tampon comprising a compressed body of absorbent material having an elongated, main body portion and a transversely enlarged end portion, and an applicator comprising a tube having an internal diameter loosely receiving said elongated body portion of the tampon but snugly receiving and frictionally gripping said transversely enlarged end portion so as to thereby frictionally retain the tampon in the applicator, said tampon being ejectable endwise from said applicator and said enlarged tampon end portion being seated in the end portion of said applicator from which the tampon is ejectable.

References Cited in the file of this patent

UNITED STATES PATENTS

| 1,964,911 | Haas | July 3, 1934 |
| 2,024,218 | Haas | Dec. 17, 1935 |
| 2,123,750 | Schulz | July 12, 1938 |
| 2,386,590 | Calhoun | Oct. 9, 1945 |
| 2,458,685 | Crockford | Jan. 11, 1949 |
| 2,464,310 | Harwood | Mar. 15, 1949 |
| 2,566,190 | Greiner et al. | Aug. 28, 1951 |

FOREIGN PATENTS

| 862,897 | France | Dec. 23, 1940 |
| 882,807 | France | Mar. 8, 1943 |